Patented July 24, 1934

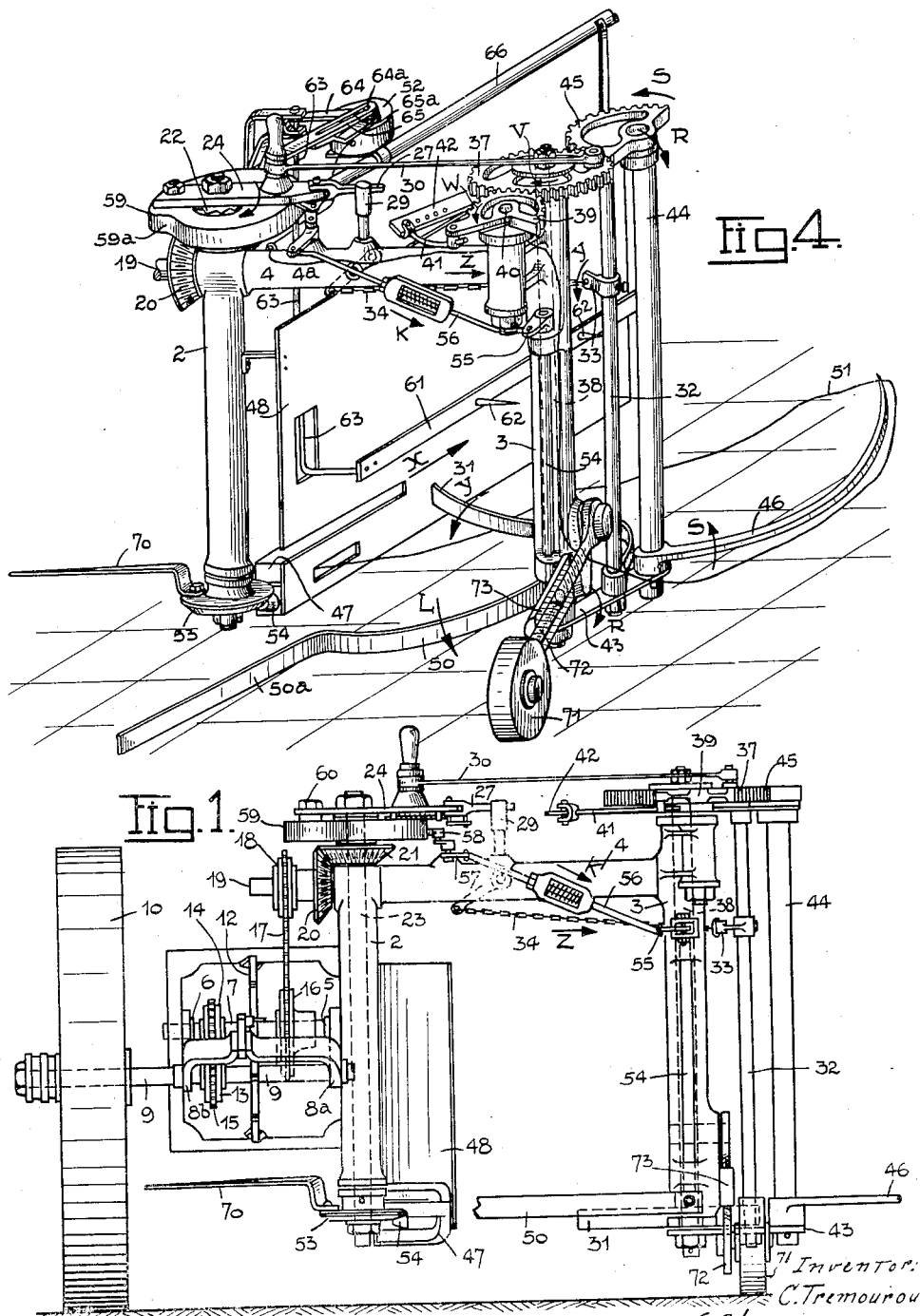

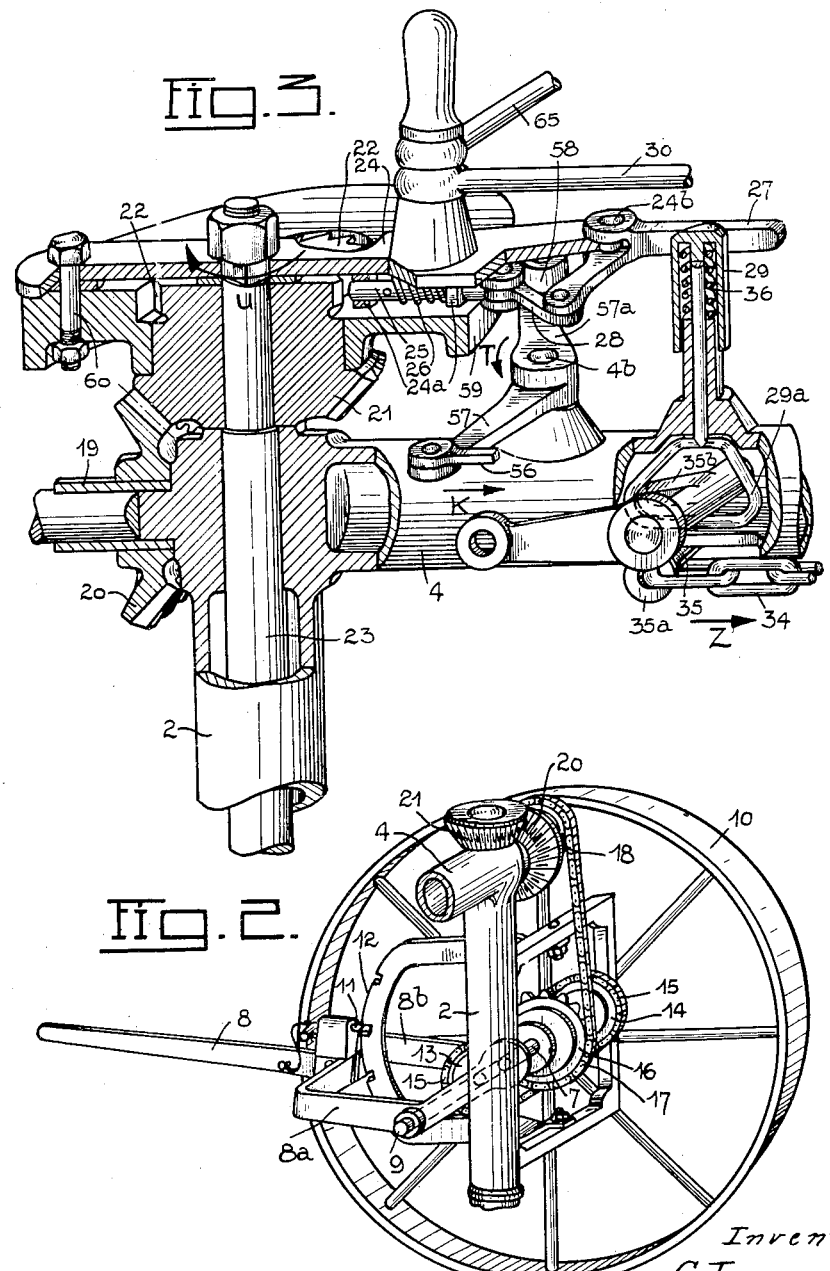

1,967,566

UNITED STATES PATENT OFFICE 1,967,566

AUTOMATIC BINDING MACHINE

Charles Tremouroux, Denee, Belgium

Application January 20, 1934, Serial No. 707,593
In Belgium January 21, 1933

13 Claims. (Cl. 56—429)

The present invention relates to an automatic binding machine for binding bundles of cereals and other plants.

Agricultural machines, generally called harvester-binders, are known in which a binding mechanism is adapted to be set in motion due to the movement of the machine when a clutch device, constantly urged towards the engaged position but adapted to be held by a stop in the disengaged position, is allowed to occupy the engaged position. In these machines, the clutch device is actuated when the cereals, which accumulate in the machine as they are mown, exert a sufficient pressure.

The automatic binding machine according to the invention is not intended to bind cereals or other plants as they are mown, but to bind heaps or shocks of plants formed on the ground.

The object of the invention is to enable the binding mechanism to be set in operation when the machine encounters heaps situated on the ground.

To this end, the automatic binding machine according to the invention comprises in addition a member called a release member which is so adapted as to move on the machine meeting a pile of materials to be bound and situated on the ground, the said member being connected by a mechanical connection to the said stop to cause the retraction of the latter upon its movement.

In practice, the distance between the heaps formed on the ground varies from one heap to another.

In order that the binding mechanism may be driven as soon as the said release member has been moved by a heap which it encounters, provision is made according to the invention, in the case in which the said clutch device is constituted by a catch-piece constantly urged to come into contact with a toothed member, which is caused to rotate by the forward movement of the binding machine, for the said toothed member to possess a large number of teeth. In this manner, even in the event of a slight forward movement of the machine, a tooth will certainly come into contact with the catch-piece.

The binding mechanism of the machine according to the invention comprises in the known manner a needle keyed to a pivot so as to be subjected to a pivoting movement which causes it to approach and then move away from the knotter. In view of the fact that the alignment of the heaps on the ground may be rather poor in practice, and that the heaps are generally rather large, the needle must make a movement of considerable amplitude in order that it shall be able to embrace all the bundles suitably.

To this end, according to the invention, the pivot of the needle is subjected to a movement towards, and then to a movement away from the knotter, while by its pivoting on itself it causes the needle to approach or move away from the knotter, respectively.

An automatic binding machine according to the invention should preferably also be able to bind the heaps at different heights according to the lengths of the stalks of the plants.

It must therefore be possible to adjust the height of the frame relatively to the carrying wheels.

To this end, the automatic binding machine according to the invention comprises a lever adapted to pivot about the shaft of one of the carrying wheels and connected to the frame, the said lever in addition being adapted to be held in different positions.

Finally, the invention relates to an arrangement, the object of which is to ensure that the heap to be bound will be driven into the machine, despite the resistance offered by the cord employed for binding the said heap.

The machine provided with this arrangement comprises a bar provided with points and mounted so as to drive the said points into the heap to be bound, and to cause the said heap to move forward towards the machine.

Other features and details of the invention will be discussed in the course of the description of the accompanying drawings, which show one constructional form of the invention diagrammatically, merely by way of example.

Figure 1 is an elevation of the entire machine.

Figure 2 is a view in perspective of the part of the machine which serves to vary the distance of the frame from the ground.

Figure 3 is a view in perspective partly sectioned and partly broken away of the clutch device of the binding mechanism and the adjacent members.

Figure 4 is a view in perspective of the binding mechanism.

The drawings show an automatic binding machine comprising a frame constituted substantially by an upright 2 (Figure 1) connected to another upright 3 by a cross-member 4. The upright 2 is rigidly connected to the bearings 5 and 6 of a shaft 7 (Figures 1 and 2) about which are engaged the ends of two arms 8a and 8b of a lever 8 adapted to pivot about the axle 9 of a carrying wheel 10. The lever 8 may be locked in different angular positions, for example, by the engagement of a stud 11 in one or the other of the notches of a sector 12 rigidly connected to the upright 2. Due to this arrangement, the height of the frame can be adjusted relatively to the carrying wheel 10.

The upright 3 is supported by a small wheel 71 (Figures 1 and 4), the axle of which is carried by a piece 72 connected to the upright 3 by a screw-threaded sleeve 73. The thread of the part engaged on the upright 3 is in the opposite direction to that of the part engaged on the piece 72. Thus, by rotating the screw-threaded sleeve 73, the height of the upright 3 above the ground may readily be varied.

The movement of rotation of the axle 9 during the forward movement of the machine is transmitted to the shaft 7, for example through the medium of a toothed wheel 13 (Figures 1 and 2) keyed to the shaft 9, a toothed wheel 14 keyed to the shaft 7 and a chain 15 passing round these two toothed wheels. Keyed to the shaft 7 is likewise another toothed wheel 16, the movement of rotation of which is transmitted through the medium of a chain 17 to a toothed wheel 18 keyed to a shaft 19 carried by the frame.

Keyed to the shaft 19 (Figures 1 and 3) is a bevel gear 20 meshing with another bevel gear 21 integral with a ratchet wheel 22 and mounted idly on a shaft 23 disposed in the upright 2. Keyed to the shaft 23 is a crank 24 rigidly connected, by a bolt 60 for example, to a cam 59 mounted idle on the tubular portion connecting the bevel gear 21 to the ratchet wheel 22. The crank 24 has two projections 24a acting as guide for a catch-piece 25 constantly urged by a spring 26 to come into contact with the teeth of the ratchet wheel 22, but held out of contact with the said teeth when a bell-crank lever 27 pivoting at 24b on the crank 24, to which it is connected by a rod 30 to the binding mechanism to be described hereinafter.

The rotation of the crank 24 by the axle 9 of the carrying wheel thus depends upon the engagement of the catch-piece 25 with the teeth of the ratchet wheel 22. This engagement is permitted when the stop 29 is retracted. This retraction is caused, when the machine advances in the direction of the arrow X, as the result of a release member constituted for example by the blade 31 meeting a heap of plants to be bound situated on the ground. Under the action of this meeting, the blade 31 (Figures 1 and 3), which will be called hereinafter the release blade, pivots in the direction of the arrow 6 with the pivot 32 to which it is keyed. A nose 33 keyed to the pivot 32 drives in the direction of the arrow Z a chain 34 which connects it to the end 35a (Figure 3) of a bell-crank lever 35 pivoted at 4a. The arm 35b of the bell-crank lever 35 which is engaged by a stirrup 29a rigidly connected to the stop 29 effects, by virtue of this fact, the retraction of the stop 29 against the action of a spring 36 which acts so as to maintain the said stop 29 in the position in which the bell-crank lever 27 abuts against it during the rotation of the crank 24 which carries it. Therefore, the effect of this spring is likewise that of returning the release blade 31 into the position in which it meets the heaps of material to be bound, as soon as the said blade 31 has been rendered free.

The binding mechanism comprises a gear 37 (Figures 1 and 4) mounted freely on a shaft 38 engaged in the upright 3 of the frame. The point at which the rod 30 is connected to the said gear is at a distance from the axis of the latter greater than the length of the crank 24. Thus, on each revolution of the crank 24, the gear 37 makes an oscillatory movement, the amplitude of which is less than one half revolution. The gear 37 meshes with another gear 39 carried by a pivot 40 mounted in the frame. The gear 39 is connected by a rod 41 to an arm 42 keyed to the shaft 38. Keyed to the latter is likewise an arm 43. The arms 42 and 43 carrying a pivot 44 to which are keyed at one end a gear 45 meshing with the gear 37 and at the other end a needle 46 of any known type.

When the machine is moving forward in the direction of the arrow X, it will be readily appreciated on studying the drawings that the ratchet wheel 22 will rotate in the direction of the arrow U. If the catch-piece 25 is allowed to come into contact with the teeth of the ratchet wheel, the gear 37 will pivot in the direction of the arrow V (Figure 4), the gear 39 in the direction of the arrow W, the arms 42 and 43 in the direction of the arrow R and the gear 45 and the needle 46 in the direction of the arrow S. The simultaneous pivoting of the arms 42 and 43 in the direction of the arrow R and of the needle 46 in the direction of the arrow S has the effect of causing the point of the needle 46 to approach the knotter 47. The amplitude of the movement of the said point is therefore considerable.

The pivot 32 to which is keyed the release blade 31 is likewise carried by the arms 42 and 43. The result of this is that the end of the nose 33, while being moved away from the bell-crank lever 35, due to the pivoting of the release blade 31 in the direction of the arrow Y, is caused to approach slightly the said bell-crank lever due to the pivoting of the arms 42 and 43 in the direction of the arrow R. The effect of this double movement is to prevent any excessive and unnecessary movement of the stop 29.

The release blade 31 is mounted resiliently on its pivot 32, for example by being itself constituted of a spring blade. Thus, when the heap of material to be bound is bulkier than usual, the release plate can bend slightly and enable the needle to reach the knotter easily.

Since the distance between the heaps on the ground may vary from one heap to the next, it is necessary that, irrespective of the distance through which the machine travels and hence irrespective of the angle of rotation of the ratchet wheel 22 from the instant at which the release blade 31 has met a heap of material, the catch-piece 25 shall be driven by the ratchet wheel 22 at the moment at which it is allowed to come into contact with the said ratchet wheel. This is the reason why the ratchet is preferably provided with numerous teeth.

On approaching the knotter 47 (Figures 1 and 4), the needle 46 compresses the heap of material to be bound between the needle itself, a guide plate 48 and a blade 59 called the retaining blade. Binding is effected as in harvester binders by means of a cord 51 passing through the end of the needle 46 and coming from a box 52, while being guided along the frame.

The knotter 47 is any desired knotter of known type. It is actuated by the shaft 23 to which is keyed a partially toothed bevel gear 53 adapted to mesh with a bevel gear 54 keyed to the shaft of the knotter.

The retaining blade 51 is keyed to a pivot 54 carried by the frame. The said pivot carries an arm 55 connected by a rod 56 to a lever 57 (Figures 3 and 4) pivoted at 4b to the frame, of which the arm 57a carries a roller 58 bearing against the cam 59 which is driven at the same time as the binding mechanism. The cam 59 has a recess 59a so disposed as to permit the lever 57 to pivot in the direction of the arrow T after the bundle has been bound. This pivoting of the lever 57 enables the rod 56 to move in the direction of the arrow K and the retaining blade to pivot in the direction of the arrow L. When the bundle has been bound, it is therefore left on the ground.

The part of the cord 51 which passes directly from the knotter to the end of the needle 46 tends to impede the engagement of the heap of material to be bound in the machine. In order to ensure this engagement, the machine comprises a bar 61 (Figure 4) provided with points 62 and subjected to a movement towards the interior of the machine after the points have been driven into the heap of materials. The said bar is rigidly connected with a rod 63 keyed to a pivoting arm 64, the movements of which are controlled by a rod 65 connected to the crank 24. The length of the arm 64 is greater than that of the crank 24.

In order to prevent a movement of the bar 61 beyond the guide plate 48, a slot 65a is provided in the rod 65. The said slot is engaged by a stud 64a by which the rod drives the arm 64. When the rod 65 begins to move in the direction opposite to that causing the engagement of the points 62 in the heap to be bound, the bar 61 remains stationary during the whole of the time that the slot 65a slides about the pin 64a. The points 62 are only disengaged from the bundle which has just been bound when the end of the slot adjacent the crank 24 abuts against the pin 64a.

Keyed to the shaft 23 is an arm 70 (Figures 1 and 4) which is so disposed as to cause the disengagement of the bundle to the exterior of the machine when it has been bound and the retaining blade 50 leaves it on the ground. The bundle on leaving the machine is guided laterally by the extension 50a of the retaining blade 50.

It is evident that the invention is not limited exclusively to the constructional form shown and that modifications may be made in the form and arrangement of the elements employed in its construction without departing from the scope of the invention.

What I claim is:

1. An automatic binding machine comprising a binding mechanism, means for actuating this binding mechanism by the movement of the carrying wheels of the binding machine, a clutch device between the binding mechanism and the said carrying wheels, means for constantly urging said clutch device towards the engagement position, a movable stop adapted to hold the said clutch device in the disengagement position, a release member adapted to be moved by its meeting with a heap of materials to be bound situated on the ground, and a mechanical connection between the said release member and the said movable stop such that it causes the retraction of the latter when the release member is moved by a heap.

2. An automatic binding machine comprising a binding mechanism, means for actuating this binding mechanism by the movement of the carrying wheels of the binding machine, a clutch device between the binding mechanism and the said carrying wheels, means for constantly urging said clutch device towards the engagement position, a movable stop adapted to hold the said clutch device in the disengagement position, a release member adapted to be moved by its meeting with a heap of materials to be bound situated on the ground, a mechanical connection between the said release member and the said movable stop such that it causes the retraction of the latter when the release member is moved by a heap, and a spring for constantly urging the said movable stop into the position in which it is capable of maintaining the said clutch device in the disengagement position.

3. An automatic binding machine comprising a binding mechanism, means for actuating this binding mechanism by the movement of the carrying wheels of the binding machine, a clutch device between the binding mechanism and the said carrying wheels, means for constantly urging said clutch device towards the engagement position, a movable stop adapted to hold the said clutch device in the disengagement position, a release member adapted to be moved by its meeting with a heap of materials to be bound situated on the ground, means for resiliently mounting the said release member, and a mechanical connection between the said release member and the said movable stop such that it causes the retraction of the latter when the release member is moved by a heap.

4. An automatic binding machine comprising a binding mechanism, means for actuating this binding mechanism by the movement of the carrying wheels of the binding machine, a clutch device between the binding mechanism and the said carrying wheels, means for constantly urging said clutch device towards the engagement position, a movable stop adapted to hold the said clutch device in the disengagement position, a release member constituted by a spring and adapted to be moved by its meeting with a heap of materials to be bound situated on the ground, and a mechanical connection between the said release member and the said movable stop such that it causes the retraction of the latter when the release member is moved by a heap.

5. An automatic binding machine comprising a binding mechanism, a ratchet wheel with a large number of teeth rotated by the forward movement of the binding machine, a catch-piece mounted on a part connected to the binding mechanism, means for constantly urging the said catch-piece toward the said teeth, a movable stop adapted to hold the said catch-piece in the disengagement position, a release member adapted to be moved by its meeting with a heap of materials to be bound situated on the ground, and a mechanical connection between the said release member and the said movable stop such that it causes the retraction of the latter when the release member is moved by a heap.

6. An automatic binding machine, comprising a knotter, a needle for cooperating with this knotter, a pivot carrying this needle, means for actuating this pivot in order that the needle be moved towards and then away from the knotter, means for displacing the said pivot towards and away from the knotter while by pivoting on itself it causes the needle to approach or move away from the knotter respectively, means for actuating the needle and the knotter by the movement of the carrying wheels of the machine, a clutch device between, on the one hand, the needle and the knotter and, on the other hand, the carrying wheels, means for constantly urging said clutch device towards the engagement position, a movable stop adapted to hold the said clutch device in the disengagement position, a release member adapted to be moved by its meeting with a heap of materials to be bound situated on the ground and a mechanical connection between the said release member and the said movable stop such that it causes the retraction of the latter when the release member is moved by a heap.

7. An automatic binding machine, comprising a knotter, a needle for cooperating with this knotter, a pivot carrying this needle, pivoting arms carrying this pivot, a shaft carrying these arms, an oscillating gear loosely mounted on this shaft, a second gear meshing with the said oscillating gear, a rod connecting this second gear with one of the said arms, a third gear keyed on the pivot of the needle and meshing with the first gear, a connecting rod between the said oscillating gear and a crank, the distance between the axis of the said oscillating gear and the point at which the connecting rod is connected being greater than the length of the crank, means for actuating the said crank by the movement of the carrying wheels of the machine, a clutch device between the said crank and the said carrying wheels, means for constantly urging said clutch device towards the engagement position, a movable stop adapted to hold the said clutch device in the disengagement position, a release member adapted to be moved by its meeting with a heap of materials to be bound situated on the ground, and a mechanical connection between the said release member and the said movable stop such that it causes the retraction of the latter when the release member is moved by a heap.

8. An automatic binding machine, comprising a knotter, a needle for cooperating with this knotter, a pivot carrying this needle, pivoting arms carrying this pivot, a shaft carrying these arms, an oscillating gear loosely mounted on this shaft, a second gear meshing with the said oscillating gear, a rod connecting this second gear with one of the said arms, a third gear keyed on the pivot of the needle and meshing with the first gear, a connecting rod between the said oscillating gear and a crank, the distance between the axis of the said oscillating gear and the point at which the connecting rod is connected being greater than the length of the crank, means for actuating the said crank by the movement of the carrying wheels of the machine, a clutch device between the said crank and the said carrying wheels, means for constantly urging the said clutch device towards the engagement position, a movable stop adapted to hold the said clutch device in the disengagement position, a pivoting blade adapted to be met by a heap of materials to be bound situated on the ground, a pivot carrying this blade supported by the said arms, a nose keyed on this pivot, and a mechanical connection between the said nose and the said movable stop such that it causes the retraction of the latter when the said blade is moved by a heap.

9. An automatic binding machine comprising a binding mechanism, means for actuating this binding mechanism by the movement of the carrying wheels of the binding machine, a clutch device between the binding mechanism and the said carrying wheels, means for constantly urging said clutch device towards the engagement position, a movable stop adapted to hold the said clutch device in the disengagement position, a release member adapted to be moved by its meeting with a heap of materials to be bound situated on the ground, a mechanical connection between the said release member and the said movable stop such that it causes the retraction of the latter when the release member is moved by a heap, a pivoting arm disposed so as to cause the disengagement of the bundle to the exterior of the machine when it has been bound, a pivot for carrying this arm, and means for actuating this pivot simultaneously with the binding mechanism.

10. An automatic binding machine comprising a binding mechanism, means for actuating this binding mechanism by the movement of the carrying wheels of the binding machine, a clutch device between the binding mechanism and the said carrying wheels, means for constantly urging said clutch device towards the engagement position, a movable stop adapted to hold the said clutch device in the disengagement position, a release member adapted to be moved by its meeting with a heap of materials to be bound situated on the ground, a mechanical connection between the said release member and the said movable stop such that it causes the retraction of the latter when the release member is moved by a heap, a lever pivoting about the axle of one of the carrying wheels, means for connecting this lever to the frame in different positions so as to modify the height of the machine.

11. An automatic binding machine comprising a binding mechanism, means for actuating this binding mechanism by the movement of the carrying wheels of the binding machine, a clutch device between the binding mechanism and the said carrying wheels, means for constantly urging said clutch device towards the engagement position, a movable stop adapted to hold the said clutch device in the disengagement position, a release member adapted to be moved by its meeting with a heap of materials to be bound situated on the ground, a mechanical connection between the said release member and the said movable stop such that it causes the retraction of the latter when the release member is moved by a heap, a pivoting bar at the height of the heap to be bound, points on this bar, and means for actuating this bar simultaneously with the binding mechanisms in such a manner that the said points are driven in the said heap and move the latter forward towards the machine.

12. An automatic binding machine comprising a binding mechanism, means for actuating this binding mechanism by the movement of the carrying wheels of the binding machine, a clutch device between the binding mechanism and the said carrying wheels, means for constantly urging said clutch device towards the engagement position, a movable stop adapted to hold the said clutch device in the disengagement position, a release member adapted to be moved by its meeting with a heap of materials to be bound situated on the ground, a mechanical connection between the said release member and the said movable stop such that it causes the retraction of the latter when the release member is moved by a heap, a pivoting bar at the height of the heap to be bound, points on this bar, a pivoting arm integral with the said bar, a rod connected to the said pivoting arm and to a crank, and means for displacing this crank simultaneously with the binding mechanism, the said bar being disposed in such a manner that the said points are driven in the said heap and move the latter forward towards the machine.

13. An automatic binding machine comprising a binding mechanism, means for actuating this binding mechanism by the movement of the carrying wheels of the binding machine, a clutch device between the binding mechanism and the said carrying wheels, means for constantly urging said clutch device towards the engagement position, a movable stop adapted to hold the said clutch device in the disengagement position, a release member adapted to be moved by its meeting with a heap of materials to be bound situated on the ground, a mechanical connection between the said release member and the said movable stop such that it causes the retraction of the latter when the release member is moved by a heap, a pivoting bar at the height of the heap to be bound, points on this bar, a pivoting arm integral with the said bar, a stud integral with the bar, a slot for receiving this stud provided in a rod, a crank to which this rod is connected, and means for displacing this crank simultaneously with the binding mechanism, the said bar being disposed in such a manner that said points are driven in the said heap and move the latter forward towards the machine.

CHARLES TREMOUROUX.